United States Patent
Lee et al.

(10) Patent No.: US 7,564,813 B2
(45) Date of Patent: Jul. 21, 2009

(54) APPARATUS FOR ADAPTIVE RESOURCE ALLOCATION FOR MULTI-CHANNEL COMMUNICATION SYSTEM, AND A METHOD THEREOF

(75) Inventors: Woo-Yong Lee, Daejeon (KR); Sok-Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 261 days.

(21) Appl. No.: 10/584,639

(22) PCT Filed: Dec. 27, 2004

(86) PCT No.: PCT/KR2004/003469

§ 371 (c)(1),
(2), (4) Date: Jun. 26, 2006

(87) PCT Pub. No.: WO2005/064820

PCT Pub. Date: Jul. 14, 2005

(65) Prior Publication Data

US 2007/0165564 A1    Jul. 19, 2007

(30) Foreign Application Priority Data

Dec. 27, 2003    (KR) .................... 10-2003-0098213

(51) Int. Cl.
  *H04Q 7/00*    (2006.01)
(52) U.S. Cl. ........................ 370/329; 370/203
(58) Field of Classification Search .............. None
  See application file for complete search history.

(56) References Cited

U.S. PATENT DOCUMENTS 5,054,034 A    10/1991    Hughes-Hartogs
6,125,150 A *   9/2000    Wesel et al. ............... 375/265
6,345,036 B1 *  2/2002    Sudo et al. ................ 370/203
6,768,729 B1 *  7/2004    Ohsuge ...................... 370/342
2003/0095506 A1 * 5/2003  Jalali et al. ............... 370/252

FOREIGN PATENT DOCUMENTS

JP    2001-177495    6/2001

OTHER PUBLICATIONS

Kronghold et al.; "Computationally Efficient Optimal Power Allocation Algorithms for Multicarrier Communications System"; IEEE; 2000; pp. 23-27.

(Continued)

*Primary Examiner*—Lester Kincaid
*Assistant Examiner*—Phuoc Doan
(74) *Attorney, Agent, or Firm*—Lowe Hauptman Ham & Berner, LLP (57) ABSTRACT

Disclosed is an adaptive resource allocation processor in the multi-channel communication system. A channel gain for the subchannel is determined and a modulation method for each subchannel is the present invention. A number of bits to be transmitted is determine according to a subchannel quality, and a minimum power for a total required transmission rate is determined. A channel gain for the subchannel is determined according to the number of allocated bits and power, an, a modulation method for each subchannel is determined with reference o the channel gain. When the modulation method for each subchannel is determined, an adaptive convex search is repeatedly performed according to the average power and transmission rate, and a final modulation method is determined as one subchannel unit with reference the convex search result.

17 Claims, 4 Drawing Sheets

OTHER PUBLICATIONS

Rhee et al.; "Increase in Capacity of Multiuser OFDM System Using Dynamic Subchannel Allocation"; IEEE; 2000; pp. 1085-1089.

Xiaoming She; "Power and Bit Allocation for Adaptive Turbo Coded Modulation in OFDM Systems"; Globecom 2003; IEEE vol. 2, Dec. 1-5, 2003; pp. 903-907.

Venkatesh Rajendran; "A Power-Efficient Resource Allocation Scheme For Multiuser OFDM"; Personal Wireless Communications, 2002; IEEE International Conference on Dec. 15-17, 2002; pp. 224-228.

International Search Rport dated Apr. 7, 2005 for PCT/KR2004/003469.

*Cheong Yui Wong, R. S. Cheng, K. B. Lataief, R. D. Murch, Multiuser OFDM with adaptive subcarrier, bit, and power allocation, Selected Areas in Communications, IEEE Journal on*, Oct. 1999, No. 10, pp. 1747-1758.

Office Action dated Nov. 28, 2008, for Japanese application No. 2006-546837.

\* cited by examiner

| Average repeat number | Greedy algorithm | Shoham algorithm | Krongold algorithm | Present invention |
|---|---|---|---|---|
| $E_s/N_o$ = 34dB | 176.7 | 59.0 | 8.18 | 4.4 |
| $E_s/N_o$ = 40dB | 300.0 | 100.2 | 32.1 | 10.1 |
| $E_s/N_o$ = 45dB | 381.0 | 127.0 | 32.8 | 10.0 |

APPARATUS FOR ADAPTIVE RESOURCE ALLOCATION FOR MULTI-CHANNEL COMMUNICATION SYSTEM, AND A METHOD THEREOF

CROSS REFERENCE TO RELATED APPLICATION

This application is the National Phase application of International Application No. PCT/KR2004/003469, filed Dec. 27, 2004, which designates the United States and was published in English. This application, in its entirety, is incorporated herein by reference.

This application claims priority to and the benefit of Korea Patent Application No. 2003-0098213 filed on Dec. 27, 2003 in the Korean Intellectual Property Office, the entire content of which is incorporated herein by reference.

BACKGROUND OF THE INVENTION (a) Field of the Invention

The present invention relates to a resource allocation processor and a method thereof. More specifically, the present invention relates to a processor for adaptive resource allocation for a multi-channel communication system and a method thereof.

(b) Description of the Related Art

Recently, the increase of the importance of image and data transmissions has created a demand for high-speed data transmission. Frequency resources are relevantly lacking, however, and therefore effective frequency use is necessary.

In a conventional orthogonal frequency division multiplexing (OFDM) system, a fixed modulating method is used or a modulating method is determined in consideration of average signal to noise ratios (SNR) for respective users. In addition, it is important to separately determine the modulating method because various SNRs are provided for respective subchannels in the OFDM system.

As a prior art, the "Ensemble Modem structure for imperfect transmission media" is disclosed in U.S. Pat. No. 5,054,034, filed on Oct. 1, 1991, wherein bits are differently allocated for the respective subchannels with reference to SNRs of the respective subchannels in a multi-carrier system, and therefore a maximum data transmission speed or a maximum performance gain is provided.

According to the U.S. Pat. No. 5,054,034, a ratio between a SNR for each subchannel and a SNR gap is computed. At this time, the SNR gap is determined by an error correction coding method or a desired bit error probability, and it represents a difference between a practical SNR and a desirable SNR to be required when a predetermined number of bits is transmitted. A number of subchannels to be used, k, is initialized to be 1, a maximum number of bits to be transmitted is intialized to be 0, and the recursive process is started. For a present number k, a number of bits to be transmitted to the respective subchannels is then computed, and the greatest number of bits is calculated. The process is repeatedly performed until k corresponds to a number of the subchannels, N, and a maximum value among the number of bit sums becomes a maximum number of bits. At this time, the number of bits is a final number of bits to be transmitted to the respective subchannels. A required power value is calculated by the final number of bits, the power is predetermined as a standard so as to establish a sum of the calculated values to be a desired value, and a subchannel allocation power is finally calculated. In this application, in order to adaptively allocate bits according to the SNRs for the respective subchannels in the OFDM method, the bits to be allocated to the subchannels are calculated increasing the number of usable subchannels with reference to SNR for each step, and therefore an optimal bit allocation is performed by using SNR in the OFDM method.

Also, in a paper entitled "Computationally Efficient Optimal Power Allocation Algorithms for Multi-carrier Communication Systems" by B. S. Krongold, disclosed in a journal, IEEE Trans. Commun, Vol. 1, pp. 23-27, 2000, a bisection method for solving modulating method determination and bit allocation problems is applied for the purpose of allocating with reference to SNR and determining a modulation method for each subchannel in the discrete multitone modulation (DMT) system. In the paper, when assuming that transmitter end is aware of channel information in the DMT system, the frequency resource is efficiently used by discriminating users according to the channel information in a frequency band.

According to the paper, it is difficult to directly find an optimal solution for a nonlinear optimization problem having an integer type of variable, and therefore the solution for the nonlinear optimization problem is found when integer conditions on variables are eliminated, and a final integer solution is found by quantizing the given real number solution. At this time, an optimal solution for the problem has not yet been provided because it is very complicated to find the solution for the optimization problem, and the integer solution is found by quantizing the given real number solution.

In addition, in a paper entitled "Increase in Capacity of Multiuser OFDM System using Dynamic Subchannel Allocation" by W. Rhee and J. M. Cioffiis, disclosed in the journal Proceedings of IEEE VTC', 2000, pp. 1085-1089, a subchannel to be allocated to each user is determined with reference to channel information in a multiuser OFDM method, an allocation power is then determined in the subchannel and therefore a problem is formulated establishing power for each subchannel and each user as a variable in order to maximize a total capacity, and an intuitional method for solving the problem is disclosed.

According to the paper, performance is expected to be reduced because the power is correspondingly distributed when the capacity for each user and each subchannel is computed. Although the capacity is maximized, the capacity is a real number value and an integer value is only used in a practically used modulation method. Accordingly, it is difficult to use the given value for a practical transmission.

A modulation method determination process is required to be performed for respective channels and time slots in order to adaptively allocate resources in the OFDM and a time division multiple access (TDMA). It is, however, difficult to practically realize in methods according to the prior art because it is very complex to perform the modulation method determination process.

SUMMARY OF THE INVENTION

The present invention provides an adaptive resource allocation processor for simply and efficiently performing modulation method determination for each subchannel of an OFDM system in the multi-channel communication system, and a method thereof.

Additional features of the invention will be set forth in the description which follows, and in part will be apparent from the description, or may be learned by practice of the invention.

The present invention discloses an adaptive resource allocation method in the multi-channel communication system.

In the method, a) a number of bits to be transmitted is allocated according to a subchannel quality, b) a minimum power for a total required transmission rate is determined, c) a channel gain for the subchannel is determined according to the allocated number of bits and power, and d) a modulation method for each subchannel is determined with reference to the channel gain. At this time, a Lagrange multiplier $\lambda$ is analytically and experimentally estimated to allocate the number of bits.

In d) determining the modulation method for each subchannel, an adaptive convex search is repeatedly performed according to the average power and transmission rate, and a final modulation method is determined as one subchannel unit with reference to the convex search result.

At this time, a relation between the average power and the transmission rate is represented as $P(R)=\sigma^2 \alpha^{-R}$ and R>0, P(R) denotes an average power-transmission rate function, $\sigma^2$ denotes a variance of radio wave signals, and $\alpha$ is greater than 1.

In performing the convex search, a) supremum $\lambda_l$ and infimum $\lambda_u$ of object transmission rates are respectively initialized to be 0 and $\infty$, b) a initial Lagrange multiplier estimate $\lambda$ corresponding to the object transmission rate $R_t$ is experimentally selected, c) a transmission rate non-constraint problem is solved until a Lagrange multiplier $\lambda$ corresponding to the object transmission rate $R_t$ is found, d) a lowest transmission rate $R_l$ and a highest transmission rate $R_h$ are searched, and e) the transmission rate non-constraint problem is solved.

The present invention also discloses an adaptive resource allocation processor in a multi-channel communication system. The adaptive resource allocation processor includes a channel estimator for estimating a channel quality, an adaptive subchannel allocator for determining a channel gain for a subchannel with reference to the estimated channel value and allocating bits and power for the subchannel with reference to the channel gain, and an adaptive bit loader for outputting a bit table and a power table according to the allocated bits and power. The adaptive resource allocation processor further includes a symbol mapper and a symbol demapper for respectively mapping and demapping bits and power of symbols according to the bit table and the power table.

The present invention provides a high speed algorithm for determining a modulation method for each subchannel to be used by using a channel response for the subchannel as a resource allocation method in the OFDM system, and therefore a system is easily realized by reducing the complexity comparing to the prior art and frequency usage efficiency is greatly increased when the adaptive modulation is applied in an outdoor data communication system operating in the OFDM method.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which similar descriptions are provided have the same reference numerals.

The respective subchannels encounter frequency non-selective fading without interference between each other due to an inverse fast Fourier transform (IFFT) of a transmitter end and a fast Fourier transform of a receiver end in the like manner of OFDM or OFDMA. In the OFDM system, an appropriate modulation method is allocated to the subchannel according to a desired data transmission speed regardless of a channel gain of the subchannel.

In the exemplary embodiment of the present invention, a modulation method determination device for the subchannel is provided in s a front end of IFFT, and it is established to use respective modulation methods according to the channel gains. Information on the determined modulation method is required to be transmitted to the receiver end by using an additional control channel, and the modulation method for each subchannel is found by the information on the modulation method and used for a demodulation in the receiver end.

In the exemplary embodiment of the present invention, the channel response is required to be found so as to provide a high speed search algorithm determining the modulation method for each subchannel to be used by using the channel response on the subchannel as a method for the resource allocation in the OFDM system, and the channel response is able to be found by estimating the channel in a time division duplex (TDD) system in which uplink and downlink channel responses are assumed to correspond to each other. The modulation/demodulation method information determined by the method according to the exemplary embodiment of the present invention is required to be transmitted to the receiver end through an additional channel because the estimated channel response is required to be transmitted through a control channel in a frequency division duplex (FDD) system.

The adaptive resource allocation method of the communication system for efficiently performing the modulation method determination of the subchannel a) determines the channel gain of the subchannel and b) determines the modulation method of each subchannel, which will be described with reference to the following figures.

Figure 1:
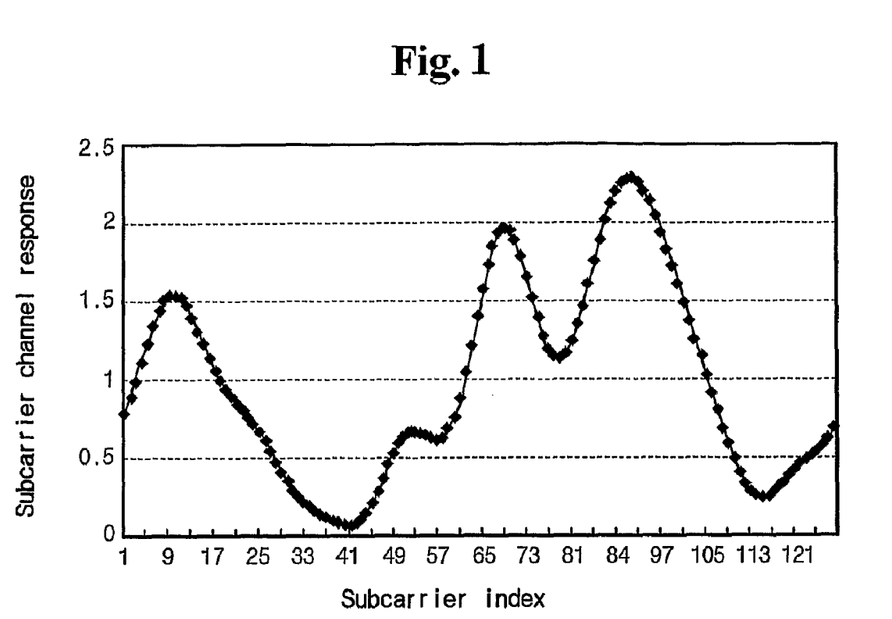
FIG. 1 shows a block diagram for representing a configuration of an adaptive resource allocation processor in an OFDM communication system according to an exemplary embodiment of the present invention.

FIG. 1 shows a block diagram for representing a configuration of an adaptive resource allocation processor in an OFDM communication system according to the exemplary embodiment to the present invention. As shown in FIG. 1, an adaptive resource allocation processor 110 according to the exemplary embodiment of the present invention includes an adaptive subchannel allocator 111, an adaptive bit loader 112, and a channel estimator/noise generator 113.

A noise variable (Noise_Var) generated from the channel estimator/noise generator 113 is input to the adaptive subchannel allocator 111, the adaptive bit loader 112, and a radio channel 120, and the noise variable is input to a symbol mapper 130 and a symbol demapper 140 for respectively mapping and demapping bits and power of respective symbols according to a bit table and a power table output from the adaptive bit loader 112.

A method for the adaptive resource allocation in the OFDM communication system will be described with reference to the configuration shown in FIG. 1.

A value of the channel gain of each subchannel is represented as $|H|_n^2 (n=1, \ldots, N)$ when a number of the subchannels is N, and a number of bits and power allocated to each subchannel are given as Equation 1 when the number of bits and power are respectively represented as $C_n$ and $P_n$.

$$P_n = \frac{f(c_n)}{|H_n|^2} \quad \text{[Equation 1]}$$

where $f(c_n)$ denotes a power for receiving the bit $C_n$.

Figure 2:
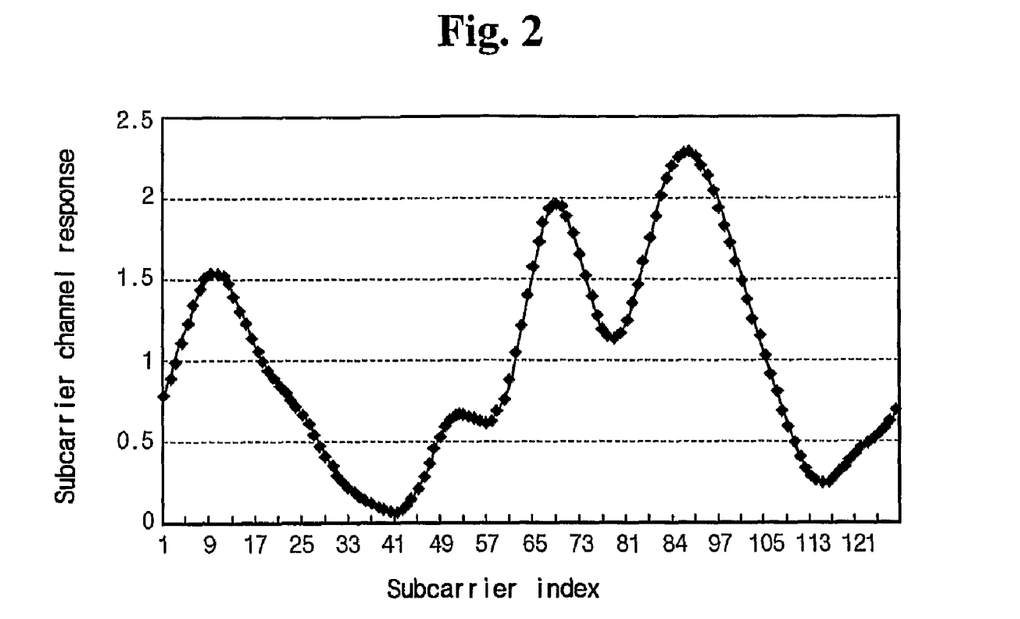
FIG. 2 shows a graph for representing channel response characteristics for 128 subchannels in an OFDM communication system according to the exemplary embodiment of the present invention.

FIG. 2 shows a graph for representing channel response characteristics corresponding to 128 subchannels in an OFDM communication system according to the exemplary embodiment to the present invention, and the graph shows response characteristics of the randomly generated subchannel.

Figure 3:
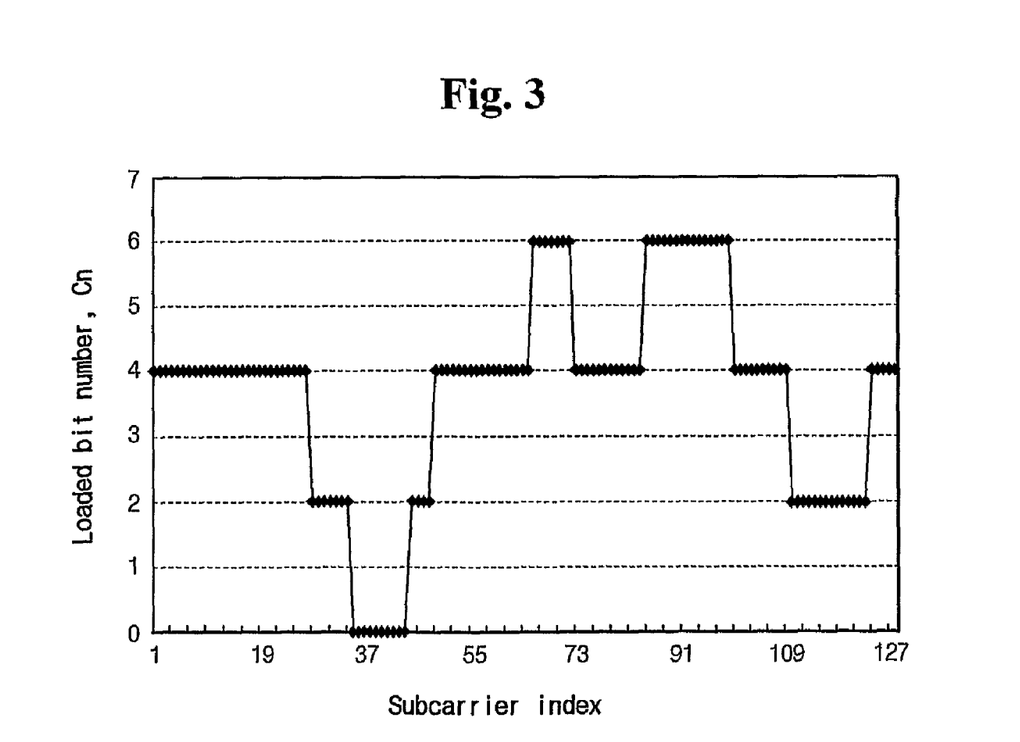
FIG. 3 shows a graph for representing a bit allocation result when a method according to the present invention is used in the subchannel response curve shown in FIG. 2 in order to describe an adaptive resource allocation method in the OFDM communication system according to the exemplary embodiment of the present invention.

FIG. 3 shows a graph for representing a bit allocation result caused when a method according to the present invention is used in the subchannel response curve shown in FIG. 2 in order to describe the adaptive resource allocation method in an OFDM communication system according to the exemplary embodiment of the present invention, and the graph shows a transmission number of bits for each subchannel. As shown in FIG. 3, more bits are transmitted to one subchannel when the channel quality is good, and fewer bits are transmitted when the gain of the subchannel is bad.

For the purpose of solving the optimization problem, the transmit number of bits for the adaptive modulation in the OFDM system is allocated by using Equation 1, and the total power $P_r$ is minimized by using Equations 2 and 3.

$$\min_{c_n} P_T = \min_{c_n} \sum \frac{f(c_n)}{|H_n|^2} \quad \text{[Equation 2]}$$

for $c_n \in \vec{C},$ $$\text{Subject to } R = \sum_{n=1}^{N} c_n \quad \text{[Equation 3]}$$

where R denotes an object data amount, and $R(c_n)$ and $P(c_n)$ respectively denote a transmission rate function and a power function for mapping a modulation of a signal $\vec{x}$ to $C_n$ in order to find an optimal solution for the problem. The transmission rate constraint power optimization adaptive modulation is a method for allocating respective subchannel modulations in order to use a minimum power for the required total transmission rates. That is, a vector of modulation for an input signal is given as Equation 4.

$$\vec{C} = (c_1, c_2, \ldots, c_N) \quad \text{[Equation 4]}$$

In this case, the transmission rate constraint for the total object number of bits $R_t$ is given as Equation 5.

$$R(\vec{C}) = \sum_{i=1}^{N} R_i(c_i) \leq R_t \quad \text{[Equation 5]}$$

The power for transmitting the total object number of bits is given as Equation 6.

$$P(\vec{C}) = \sum_{i=1}^{N} P_i(c_i) \quad \text{[Equation 6]}$$

A vector $\vec{C}$ for minimizing the power is found with reference to the above equations.

At this time, the transmission rate constraint problem of Equations 4 to 6 may be simplified into a non-constraint problem by using a Lagrange multiplier $\lambda$. The simplifying process is based on an integer bit allocation process, and is given as in the following equations.

The Lagrange multiplier $\lambda$ is estimated in an experimental way for the purpose of applying the Lagrange multiplier $\lambda$ to a practical problem for the bit allocation. In addition, the non-constraint problem may be embodied by Equation 7 in order to disclose a further organized method for finding the Lagrange multiplier $\lambda$.

$$\min\{P(\vec{C}) - \lambda R(\vec{C})\} = \min_{\{c_n\}} \sum_{n=1}^{N} \{P_n(c_n) - \lambda R(c_n)\} \quad \text{[Equation 7]}$$

An optimal solution for minimizing a total sum by minimizing each item is given by Equation 7, and exclusively finding a solution for each item is shown as Equation 8.

$$\min_{c_n}\{P_n(c_n) - \lambda R_n(c_n)\}, \quad \text{[Equation 8]}$$

for $n = 1, \cdots, N$

When a transmission rate for a predetermined rate or a highest transmission rate for a plurality of solutions is less than the object transmission rate $R_t$, a lesser Lagrange multiplier $\lambda$ is selected for the purpose of having a solution representing a higher transmission rate in a next step. That is, when the predetermined solution is greater than the object transmission rate $R_t$, a higher Lagrange multiplier $\lambda$ is selected for the purpose of having a solution representing a lesser transmission rate in the next step. This process is repeatedly performed until a Lagrange multiplier $\lambda$ corresponding to the object transmission rate $R_t$ is found.

Figure 4:
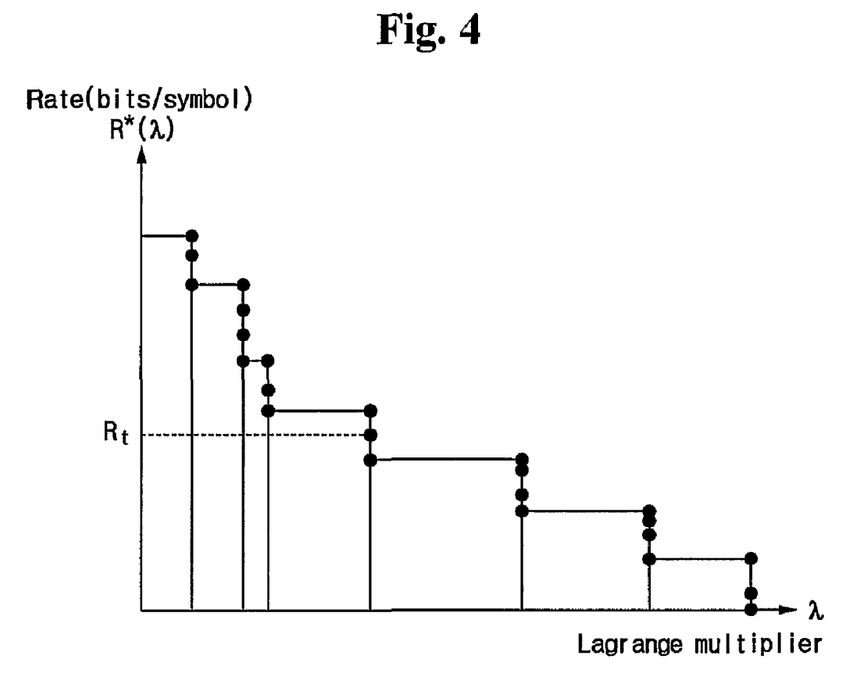
FIG. 4 shows a graph for representing a relation between Lagrange multipliers and conventional transmission rates in order to describe an adaptive resource allocation algorithm according to the exemplary embodiment of the present invention.

FIG. 4 shows a diagram for representing a relation between the Lagrange multiplier and the conventional transmission rate for the purpose of describing an adaptive resource allocation algorithm according to the exemplary embodiment of the present invention.

A relation between an average power and the transmission rate for the given channel response and a modulator is given as Equation 9. That is, an average power-transmission rate function P(R) is given as Equation 9.

$$P(R) = \sigma^2 \alpha^{-R}, R > 0 \qquad \text{[Equation 9]}$$

where $\sigma^2$ denotes a variance for radio wave signals, and at this time, $\alpha$ is greater than 1.

Figure 5:
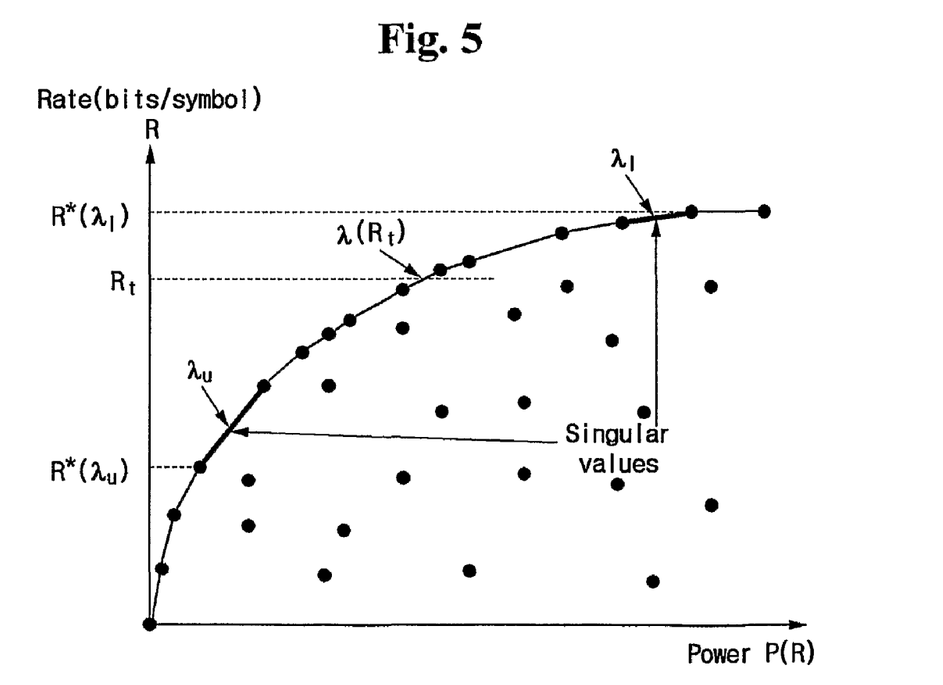
FIG. 5 shows a graph for representing an adaptive convex search algorithm process for searching an optimal solution $\lambda^*$ for a given object transmission rate $R_t$ in the exemplary embodiment of the present invention.

A quick astringency and an initial value selection are keys to using the repetitive method for solving the non-constraint problem of Equation 7. As shown in FIG. 5, $\lambda_l$ and $\lambda_u$ for satisfying a relation of $R(\lambda_u) \leq R_t \leq R(\lambda_l)$ may be selected in order to solve the problem.

FIG. 5 shows a diagram for representing an adaptive convex search algorithm process for searching an optimal solution $\lambda^*$ for the object transmission rate $R_t$ in the exemplary embodiment of the present invention.

As shown in FIG. 5, the adaptive convex search algorithm is provided in order to search the optimal solution $\lambda^*$ for the object transmission rate $R_t$. Equation 10 is derived from the Equations 7 to 9.

$$\lambda = -\frac{\partial P(R)}{\partial R} = \alpha^{-R} \sigma^2 \ln\alpha \qquad \text{[Equation 10]}$$

$\lambda_l$ and $\lambda_u$ are estimated by Equation 10, and a relation between them is also estimated by Equation 10.

$$\lambda_u = \alpha^{-R(\lambda_u)} \sigma^2 \ln\alpha, \qquad \text{[Equation 11]}$$

$$\lambda_l = \alpha^{-R(\lambda_l)} \sigma^2 \ln\alpha, \qquad \text{[Equation 12]}$$

$$\frac{\lambda_u}{\lambda_l} = \alpha^{R(\lambda_u) - R(\lambda_l)} \qquad \text{[Equation 13]}$$

Accordingly, an optimal $\lambda^*$ corresponding to the object transmission rate $R_t$ is derived from Equations 10, 11, 12, and 13.

$$\lambda^*(R_t) = \alpha^{-R_t} \sigma^2 \ln\alpha \qquad \text{[Equation 14]}$$
$$= \lambda_l \alpha^{R(\lambda_l) - R_t} \sigma^2 \ln\alpha$$
$$= \lambda_l \left(\frac{\lambda_u}{\lambda_l}\right)^{\left(\frac{R(\lambda_l) - R_t}{R(\lambda_l) - R(\lambda_u)}\right)}$$

Similarly, a following optimal $\lambda^*$ corresponding to the object transmission rate $R_t$ is also derived from Equations 10, 11, 12, and 13.

$$\lambda^*(R_t) = \lambda_u \left(\frac{\lambda_l}{\lambda_u}\right)^{\left(\frac{R_t - R(\lambda_u)}{R(\lambda_l) - R(\lambda_u)}\right)} \qquad \text{[Equation 15]}$$

The adaptive convex research algorithm for searching the optimal solution $\lambda^*$ for the given object transmission rate $R_t$ is performed as in the following processes by using Equations 14 and 15.

A Lagrange multiplier infimum $\lambda_l$ and a Lagrange Multiplier supremum $\lambda_u$ are selected to be respectively 0 and $\infty$ as an initialization for minimizing a total symbol power for the object transmission rate $R_t$.

a) An initial Lagrange multiplier estimate $\lambda$ for the object transmission rate $R_t$ is selected in an experimental way.

b) The non-constraint problem Equation 7 is solved as follows:

the lowest transmission rate $R_t$ (number of bits) and a highest transmission rate $R_h$ are found when the Lagrange multiplier $\lambda$ is a singular value; and one transmission rate satisfying a relation of $R_l = R_h = R(\lambda)$ is found when the Lagrange multiplier $\lambda$ is a non-singular value.

c) $R_l$ and $R_h$ are searched as follows:

$\lambda$ becomes $\lambda^*$ when a relation of $R_l \leq R_t \leq R_h$ is given, and at this time, the optimal solution is found, and therefore the process is finished;

a transmission rate $R_H (> R_h)$ in which a power reduction rate is maximized comparing to the transmission rate increase at $R_h$ is found when a relation of $R_h < R_t$ is given the supremum $\lambda_u$ is updated with an inclination between $R_h$ and $R_H$. At this time, $R_H$ is given by searching available modulation methods having transmission rates greater than $R_h$. At this time, $\lambda_u$ becomes $\lambda^*$ when a relation of $R_h \leq R_t \leq R_H$ is given, the optimal solution is found, and therefore the process is finished. If $\lambda_l$ is 0, the Lagrange multiplier $\lambda$ for a next process is estimated in an experimental way. When $\lambda_l$ is not 0, the Lagrange multiplier $\lambda$ for a next process is estimated by Equation 14 or Equation 15; b) is performed again;

a transmission rate $R_L (< R_l)$ in which a power reduction rate is maximized compared to the transmission rate increase at $R_l$ is found when a relation of $R_l > R_t$ is given. $\lambda_l$ is updated with an inclination between $R_l$ and $R_L$. $R_L$ is obtained by searching available modulation methods having transmission rates less than $R_l$. At this time, $\lambda_l$ becomes $\lambda^*$ when a relation of $R_L \leq R_t \leq R_l$ is given, and the optimal solution is found, and therefore the process is finished. If $\lambda_h$ is $\infty$, the Lagrange multiplier $\lambda$ for a next process is estimated in an experimental way. When $\lambda_h$ is not $\infty$, the Lagrange multiplier $\lambda$ for a next process is estimated by Equation 14 or Equation 15; and b) is performed again.

The described adaptive convex search algorithm according to the present invention is further simply computed while showing a performance of the optimal solution. A final modulation method is determined by applying a modulation method determination used in the OFDM system as a subchannel unit through the above process. A performance is shown as FIG. 6 when the algorithm according to the present invention is used in a wireless LAN system based on the OFDM.

Figure 6:
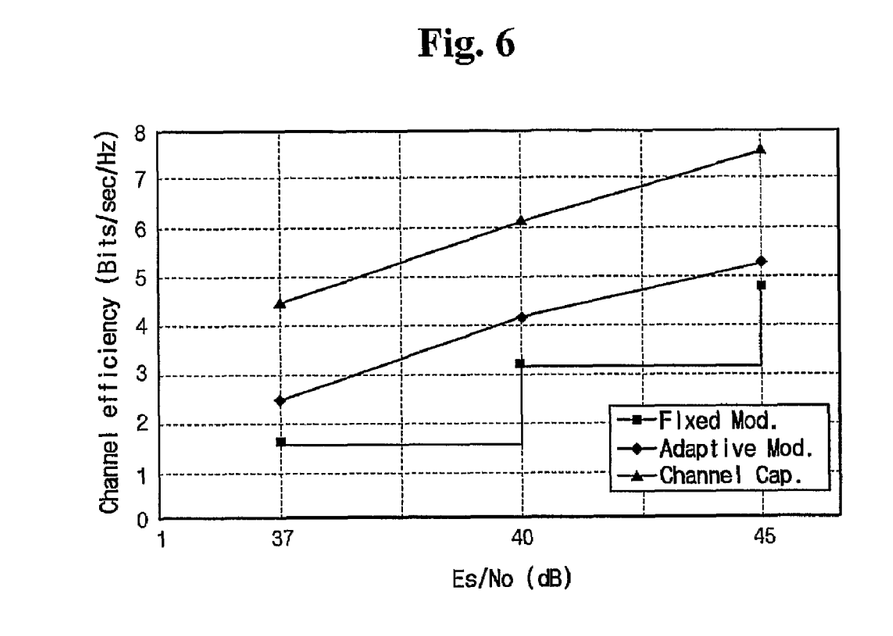
FIG. 6 shows a graph for representing a comparison between average channel capacity and system efficiency for each OFDM symbol in the OFDM communication system according to the exemplary embodiment of the present invention.

FIG. 6 shows a graph for comparing average channel capacitance and system efficiency for each OFDM symbol in the OFDM communication system according to the exemplary embodiment of the present invention, wherein three modulation methods (QPSK (Quaternary Phase Shift Keying), 16 QAM (Quadrature Amplitude Modulation), and 64 QAM) are applied for 128 subchannels, a data transmission rate is 258.3 Msps, and a required BER is $10^{-5}$. The channel is a Rayleigh fading channel, an exponent functional power reduction is assumed, and a maximum delay spread is assumed to be 70 ns. At this time, a result of simulation tests is a value obtained by an average of 100 times repeated tests.

Figure 7:
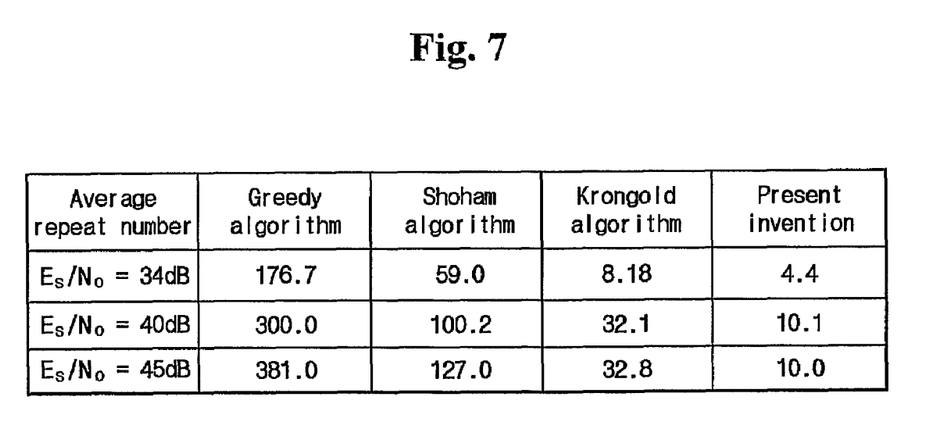
FIG. 7 shows a table for representing a comparison of performance between an algorithm according to the exemplary embodiment of the present invention and the conventional algorithm.

FIG. 7 shows a table for comparing performances between the algorithm according to the present invention and the conventional algorithms. Average repeat numbers for the optimal bit allocation in the conventional algorithms and the algorithm according to the present invention are compared to each other in the table, and the table shows that the complexity is simply realized according to the present invention.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

According to the present invention, the complexity is significantly reduced compared to the conventional system, and is simply realized when the adaptive modulation method is applied in an indoor data communication system operating in the OFDM method.

According to the present invention, a considerable usage power gain is provided compared to the system using the conventional fixed modulation method, and frequency usage efficiency is further increased.

What is claimed is:

1. An adaptive resource allocation method in a multi-channel communication system, comprising:
    determining, by an adaptive resource allocation processor, a subchannel channel gain according to channel quality; and
    determining, by the adaptive resource allocation processor, a modulation method for each subchannel based on the channel gain,
    wherein the determining of the modulation method includes:
    allocating a number of bits to be transmitted to a subchannel according to the channel gain;
    determining an optimal solution to obtain minimum power for a total transmission rate according to the number of bits; and
    allocating a final number of bits to be transmitted for the subchannel according to the optimal solution;
    wherein the determining of the optimal solution includes adaptively performing a convex search in a recursive manner according to an average power and an object transmission rate $R_t$, and the final number of bits is determined based on a result of the convex search;
    wherein the convex search includes solving a transmission rate non-constraint problem unil a Lagrange multiplier $\lambda$, corresponding to the object transmission rate $R_t$, is found;
    wherein a less Lagrange multiplier $\lambda$ is selected for the purpose of having a solution representing a higher transmission rate in a next step when a transmission rate for a predetermined solution, or a highest transmission rate for a plurality of solutions is less than the object transmission rate $R_t$, which is repeatedly performed until the Lagrange multiplier $\lambda$ corresponding to the object transmission rate $R_t$ is found.

2. The adaptive resource allocation method of claim 1, wherein, a Lagrange multiplier $\lambda$ is analytically and experimentally estimated to determine the optimal number of bits.

3. The adaptive resource allocation method of claim 1, wherein a relation between the average power and the object transmission rate $R_t$ is represented as $P(R)=\sigma^2 \alpha^{31\ R}$ and $R>0$ with reference to a given channel response and a modulator, where P(R) denotes an average power-transmission rate function, $\sigma^2$ denotes a variance of radio wave signals, and $\alpha$ is greater than 1.

4. The adaptive resource allocation method of claim 1, wherein the convex search process for searching an optimal solution $\lambda^*$ for the object transmission rate $R_t$ comprises:
    a) respectively initializing a supremum $\lambda_l$ and an infimum $\lambda_u$ of the object transmission rate $R_t$ to be 0 and $\infty$;
    b) experimentally selecting an initial Lagrange multiplier estimate of $\lambda$ for the object transmission rate $R_t$;
    c) solving the transmission rate non-constraint problem until a Lagrange multiplier $\lambda$ corresponding to the object transmission rate $R_t$ is found;
    d) searching for a lowest transmission rate $R_l$ and a highest transmission rate $R_h$; and
    e) returning to solving the transmission rate non-constraint problem.

5. The adaptive resource allocation method of claim 4, wherein the initial Lagrange Multiplier value of $\lambda$ satisfies:

$$\lambda = -\frac{\partial P(R)}{\partial R} = \alpha^{-R}\sigma^2 \ln\alpha.$$

6. The adaptive resource allocation method of claim 4, wherein, in c) for solving the transmission rate non-constraint problem, a lowest transmission rate $R_l$ and a highest transmission rate $R_h$ are found when the initial estimate $\lambda$ is a singular value.

7. The adaptive resource allocation method of claim 4, wherein, in c) for solving the transmission rate non-constraint problem, one transmission rate satisfying a relation of $R_l = R_h = R(\lambda)$ is found when the initial estimate $\lambda$ is not a singular value.

8. The adaptive resource allocation method of claim 4, wherein, in d) for searching for the lowest transmission rate $R_l$ and the highest transmission rate $R_h$, the initial estimate $\lambda$ becomes the optimal value when a relation of $R_l \leq R_t \leq R_h$ (lowest transmission rate≦object transmission rate≦highest transmission rate) is given.

9. The adaptive resource allocation method of claim 4, wherein, in d) for searching for the lowest transmission rate $R_l$ and the highest transmission rate $R_h$, a transmission rate $R_H(>R_h)$ in which a power reduction rate is maximized compared to the transmission rate increase at $R_h$, and the supremum $\lambda_u$ is updated with an inclination between $R_h$ and $R_H$ when a relation of $R_h < R_t$ (highest transmission rate<object transmission rate) is given.

10. The adaptive resource allocation method of claim 9, wherein the transmission rate $R_H$ in which the power reduction rate is maximized is found by searching for available modulation methods having transmission rates greater than $R_h$.

11. The adaptive resource allocation method of claim 10, wherein the initial Lagrange multiplier estimate $\lambda$ becomes the optimal solution when a relation of $R_h \leq R_t \leq R_H$ (highest transmission rate≦object transmission rate≦transmission rate in which the power reduction rate is maximized) is given.

12. The adaptive resource allocation method of claim 11, wherein the initial Lagrange multiplier estimate $\lambda$ for a next process is estimated in an experimental manner when the infimum is 0, and the estimate Lagrange multiplier $\lambda$ for a next process is calculated by the equation 14 or 15 when the infimum is not 0.

13. The adaptive resource allocation method of claim 4, wherein, in d) for searching for the lowest transmission rate $R_l$ and the highest transmission rate $R_h$, the transmission rate $R_L(<R_l)$ in which the power reduction rate is maximized compared to the transmission rate increase at the lowest transmission rate $R_l$ is found and the supremum $\lambda_l$ is updated with an inclination between $R_l$ and $R_L$ when a relation of $R_l > R_t$ (lowest transmission rate>object transmission rate) is given.

14. The adaptive resource allocation method of claim 13, wherein the transmission rate $R_L$ in which the power reduction is maximized is found by searching for available modulation methods having transmission rates less than $R_l$.

15. The adaptive resource allocation method of claim 14, wherein an initial Lagrange multiplier estimate $\lambda$ becomes the optimal value when a relation of $R_L \leq R_t \leq R_l$ (transmission rate in which power reduction rate is maximized≦object transmission rate≦lowest transmission rate) is given.

16. The adaptive resource allocation method of claim 15, wherein the initial Lagrange multiplier estimate $\lambda$ for a next process is estimated in an experimental way when the supremum $\lambda_u$ is $\infty$, and the estimate Lagrange multiplier $\lambda$ for a next process is calculated by the equation 14 or 15 when the supremum is not $\infty$.

17. An adaptive resource allocation method in a multi-channel communication system, comprising:

a) allocating, by an adaptive resource allocation processor, a number of bits to be transmitted according to a subchannel quality;

b) determining, by the adaptive resource allocation processor, a minimum power for a total transmission rate;

c) determining, by the adaptive resource allocation processor, a channel gain for the subchannel according to the allocated number of bits and the power; and d) determining, by the adaptive resource allocation processor, a modulation method for each subchannel based on the channel gain, comprising:

adaptively performing a convex search in the recursive manner according to the average power and an object transmission rate $R_t$; and determining an initial Lagrange multiplier estimate of $\lambda$ for the object transmission rate $R_t$, wherein the initial Lagrange Multiplier value of $\lambda$ satisfies:

$$\lambda = -\frac{\partial P(R)}{\partial R} = \alpha^{-R}\sigma^2 \ln\alpha.$$

* * * * *